US007269846B2

(12) United States Patent
Chennakeshu et al.

(10) Patent No.: US 7,269,846 B2
(45) Date of Patent: Sep. 11, 2007

(54) MOBILE TERMINAL HAVING VIRUS RESISTANT SECURITY MODULE ARCHITECTURE

(75) Inventors: Sandeep Chennakeshu, Cary, NC (US); William O. Camp, Jr., Chapel Hill, NC (US)

(73) Assignee: Bank of America Corporation, Charlotte, NC (US)

( * ) Notice: Subject to any disclaimer, the term of this patent is extended or adjusted under 35 U.S.C. 154(b) by 918 days.

(21) Appl. No.: 10/231,958

(22) Filed: Aug. 30, 2002

(65) Prior Publication Data

US 2004/0054911 A1 Mar. 18, 2004

(51) Int. Cl.
G06F 17/00 (2006.01)
G06F 7/04 (2006.01)
H04L 12/58 (2006.01)

(52) U.S. Cl. .................. 726/4; 726/17; 455/412.1
(58) Field of Classification Search .............. 726/4, 726/17; 455/412.1
See application file for complete search history.

(56) References Cited

U.S. PATENT DOCUMENTS

| 6,078,908 | A | 6/2000 | Schmitz |
| 6,195,542 | B1 | 2/2001 | Griffith |
| 2002/0115477 | A1* | 8/2002 | Singh ..................... 455/566 |

FOREIGN PATENT DOCUMENTS

| WO | WO98 34203 | | 8/1998 |
| WO | WO 01/17296 A | | 3/2001 |
| WO | WO 0184770 | * | 3/2001 |
| WO | WO 0117296 | * | 11/2001 |

OTHER PUBLICATIONS

Pfleeger (Charles P. Pfleeger, "Security in computing", 2nd edition, 1996, ISBN: 0133374866), p. 293.*
Microsoft (Microsoft Press, "Microsoft Press Computer Dictionary", 3rd edition, ISBN: 157231446X, 1997.*
International Search Report. PCTUS03 27325 Aug. 29, 2003. Sony Ericsson Mobile Communications AB.

* cited by examiner

Primary Examiner—Kambiz Zand
Assistant Examiner—Peter Poltorak
(74) Attorney, Agent, or Firm—Moore & Van Allen PLLC; Steven B. Phillips

(57) ABSTRACT

Mobile terminal having virus resistant security module architecture. An embedded security module can control the presentation of information on a display by controlling access to display memory. In some embodiments, the security module is also provided with an interface to enable it to handle user input function as well. In this way, the presentation of transaction information and receipt of user input can be substantially isolated from the main, control microprocessor of the terminal for enhanced security, especially protection against resident viruses. In addition, the security module can copy display data into the authentication and/or authorization message that is returned by the terminal to the base station. The return of the display data provides an extra, secure confirmation of the transaction.

11 Claims, 7 Drawing Sheets

MOBILE TERMINAL HAVING VIRUS RESISTANT SECURITY MODULE ARCHITECTURE

BACKGROUND

With the advent of mobile e-commerce, the security of mobile phones and other mobile terminals has become a prime concern. Such terminals shall be referred to herein simply as "mobile terminals" or "wireless communication terminals". In many current mobile terminals, a removable type of security element is included. This removable security element is called the subscriber identity module (SIM). A SIM is typically present in a mobile terminal that operates according to the well-known Global System for Mobile (GSM) standard. A SIM can include mechanisms for securing the radio link of the mobile terminal.

One problem with a removable security element is that to make the element removable, a connection must be exposed to the outside world. This connection can present an opportunity for tampering with the mobile terminal. Thus, when new mobile terminals include applications such as e-commerce applications, another type of "security module" is used which is hard-wired into the terminal. A security module of this type typically consists of a core of security related functions such as random number generation, encryption, and hash algorithms, built into the semiconductor logic of the mobile terminal.

FIG. 1 illustrates the known method and apparatus for securing transactions with a security module as described above. FIG. 1 only shows the portions of a mobile terminal which are involved in this process. The mobile terminal is controlled by a control processor, 100, which is part of a processing platform. The control processor is typically a microprocessor, digital signal processor, or embedded processor, which serves as the main or central processing unit (CPU) for the mobile terminal. Security module 102 is typically embedded in logic, which in turn is implemented by one or more custom or semi-custom semiconductor chips, or an application specific integrated circuit (ASIC). Control processor 100 addresses display device 104 through display memory (typically random access memory or RAM) 106. Control processor 100 and security module 102 may or may not be on the same ASIC. In this example, the display is a liquid crystal display (LCD). Control processor 100 receives user input from user input devices 108 through interface 110. A keypad is a typical user input device, but by no means the only type of user input device that can be present. Radio tower 120 transmits and receives signals between a base station, 121, and the mobile terminal. Ultimately, complementary security function such as key exchange, encryption/decryption, authentication, and verification are provided through base station 121 by server 122, which is connected through wide area network (WAN) 123 to gateway 124. Gateway 124 is connected to a switching node, in this example mobile switching center (MSC) 125, which serves the base station. Numbers in circles in FIG. 1 represent process steps. When a transaction is sought to be authenticated and authorized by a merchant or similar party, transaction information is sent over the air to the mobile terminal, and then handled by the control processor and forwarded to security module 102, as shown at step (1). The security module performs several tasks such as authenticating the transaction and verifying integrity, and forwards the information back through the control processor to be written to the display memory, 106, for display at step (2). The control processor, controls this process. User input, as shown at 108, is received by the control processor through interface 110, under the control of the control processor, and back to the security module at step (3). The security module verifies the information and forwards it back to the control processor, which eventually sees that the user input, authenticating and authorizing the transaction via a digital signature (for non-repudiation), is sent back to the base station at step (4), for eventual processing by the other network elements.

Although the security module in the scenario described above verifies incoming and outgoing messages, local display at the mobile terminal as well as user input processing is managed an controlled by the mobile terminal's control processor or CPU. Although the security module prevents data from being maliciously tampered with as it is being sent-back and forth between the control processor and the base station, a virus, 126, resident in the processing platform of the mobile terminal, could still interfere with the proper display of transaction information, and the proper indication of authorization by the user.

SUMMARY

The present invention provides for enhanced mobile terminal security through a design architecture in which an embedded security module can control the presentation of information on a display by controlling access to display memory. In some embodiments, the security module is also provided with an interface to enable it to handle user input function as well. In this way, the presentation of transaction information and receipt of user input can be substantially isolated from the main, control microprocessor of the terminal for enhanced security, especially protection against resident viruses.

A mobile terminal according to some embodiments of the invention operates by first authenticating or verifying a transaction when transaction information is received. This authentication is performed by the security module in the normal fashion. Once the transaction has been verified, control of at least some input/output function of the mobile terminal is switched from the control microprocessor to the security module. "Input/output function" includes any one or both of display of information, and receipt of any kind of user input. Information on the transaction is then presented to the user, at least in part under the control of the security module for authorization. Authorization input is typically received from the user, and the authorization input is communicated to the wireless network, where it is eventually returned to the source. At this point, control of the input/output function of the mobile terminal is returned to the control processor. Transaction information is typically displayed on a visual display such as an LCD. The security module of the invention may control all of the information on the display, or only a portion of the information. Optionally, the security module may also control an interface to user input devices. These user input devices may use one or more of various techniques, including keypad entry of a personal identification number (PIN) or some other authorization information, voice recognition, fingerprint recognition, retina scan, or any other input technique which may be used for user authorization and/or identification of a user. Whereas security is enhanced by transferring control to the security module, alternative implementations may be created with partial or full control remaining with the control microprocessor.

A mobile terminal implementing the present invention, in some embodiments, includes a radio block for sending and receiving wireless messages over a wireless network, the display, at least one user input device, and a core processing functional block containing the main control processor. The security module according to the invention includes its own display memory, operable to store the information to enable the secure presentation to the user on the display. In some embodiments, the security module also contains an interface for receiving user input of transaction authorization information. In some embodiments, the display memory and/or the interface are dedicated for use within the security module, and are present in the mobile terminal in addition to display memory and interface components which are part of or associated with the main control processor. In other embodiments the display memory and/or the interface for user input, which serve the entire function for the mobile terminal are contained in or associated with the security module. In this case, the display memory and, if necessary the interface, can be selectively addressed or used by either the security module or the control processor, wherein the selection is also controlled by the security module. Thus, the hardware, in combination with the software and/or microcode that performs the methods described herein forms the means to carry out the invention.

In other embodiments, it is possible, because the security module has access to display memory, for the security module to copy display data for insertion in the authentication and/or authorization message that is returned by the mobile terminal to the network based server performing authentication at the other end to provide a service. This display data is copied contemporaneously with the receiving of the authorization from the user. Since the display data is presumptively representative of the transaction information which the user is viewing, the return of the display data provides extra, secure confirmation of the transaction, thus further enhancing the security of a mobile terminal according to the present invention.

DETAILED DESCRIPTION OF ONE OR MORE EXAMPLE EMBODIMENT(S)

Figure 1:
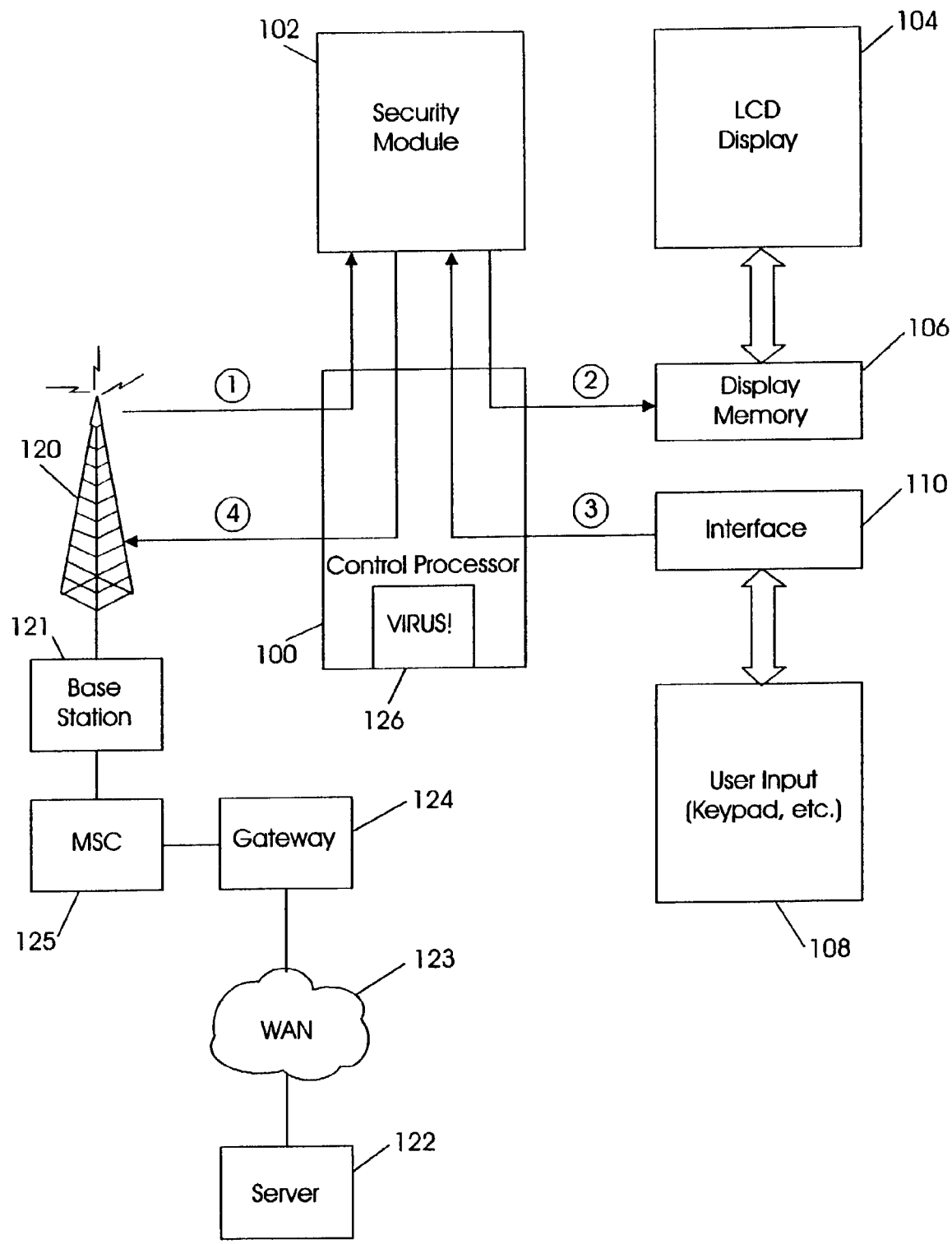
FIG. 1 is a block diagram of some of the components within a mobile terminal of the prior art, and also illustrates how the components interact when a transaction is authorized.
Figure 2:
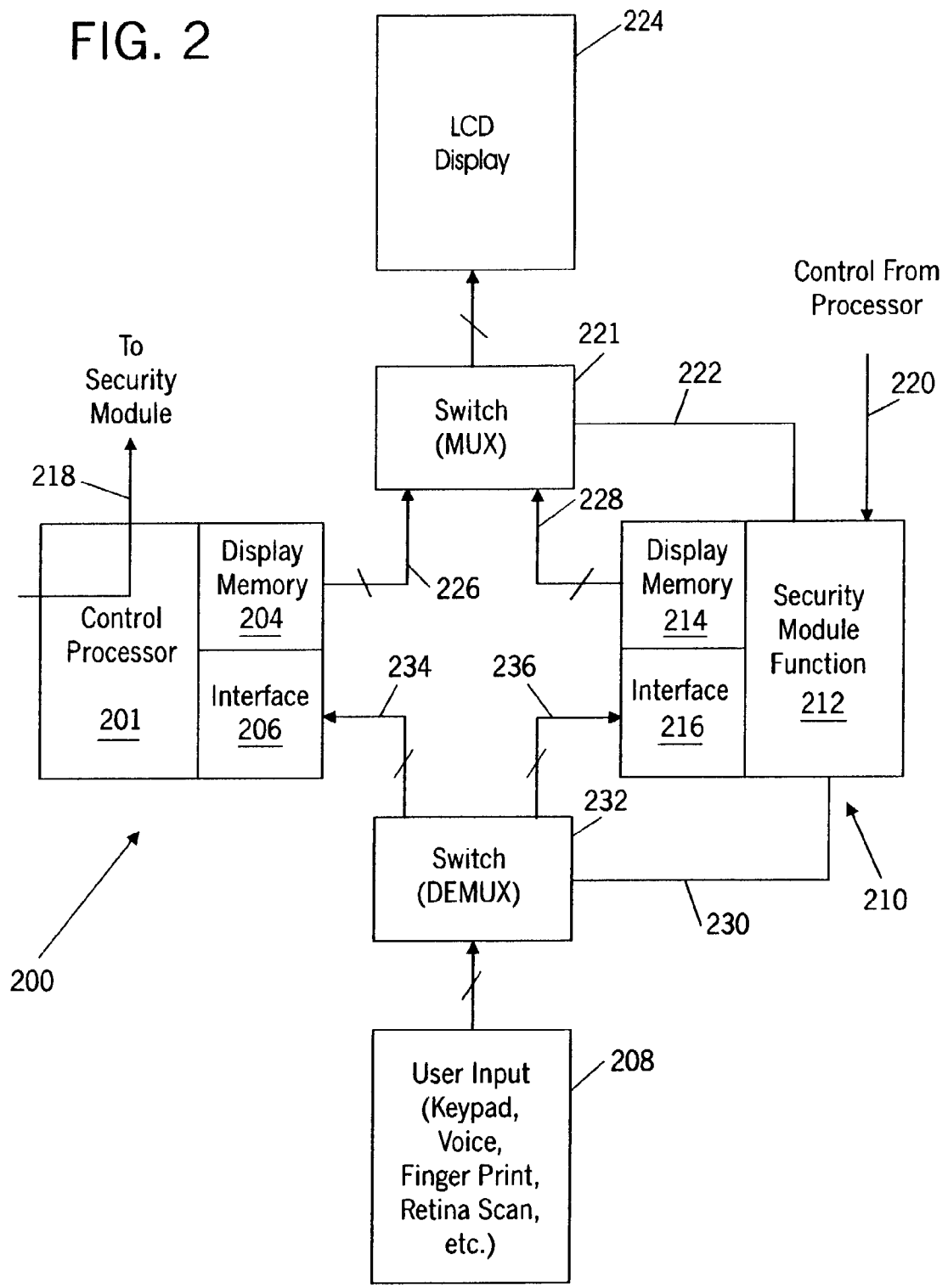
FIG. 2 is a block diagram illustration of some of the hardware components in a mobile terminal according to one embodiment of the invention.

FIG. 2 is a block diagram representing a portion of a mobile terminal according to some embodiments of the invention. In FIG. 2, processing platform 200 includes control processor 201, display memory 204, and interface 206 for user input devices shown at 208. In example embodiments, the display memory is a display random access memory, or display RAM. Security module 210, in some embodiments disposed within the baseband logic, includes security module functions 212, its own display memory, 214, and an interface for user input devices, 216. As before, transaction information received from the network can be sent to the security module by the main control processor for verification as shown by messaging arrows 218 and 220. Assuming the transaction is verified, or authenticated, control of at least the display system is assumed by security module 210. This assumption of control is accomplished through the security module exercising control of a switch, typically a multiplexer or "MUX" 221, via the control line, 222. At this point, the visual display, in this case, LCD display 224, is switched from reading display memory 204 through lines 226 to reading display memory 214 through lines 228. Since the security module has complete control over what is displayed, a virus resident in the microprocessor or control processor of the processing platform cannot cause the display of false data. When the transaction is complete, the display is reconnected to display memory 204 by MUX 221 under the control of the security module through control line 222.

FIG. 2 illustrates further, optional function which can be included in the security module of the invention to further enhance the security of mobile terminal transactions. In this embodiment, security module 210, via interface 216, can control the receipt of input from various user input devices. This control is executed through control line 230, which is used to control switch, typically a demultiplexer, or "DEMUX" 232. In a manner similar to that just related for display control, DEMUX 232 then switches from supplying user input to interface 206 through lines 234 to supplying user input to interface 216 through lines 236. Typically, user input involves entering a personal identification number (PIN) on a keypad. However, the scheme described above can easily be adapted to other types of input used for user authorization. Examples might include voice input, fingerprint recognition, retina scan, or other used to provide user authorization and identification.

As previously discussed, the security module is hardwired and/or hard coded into the logic of a mobile terminal. Security module function is provided by a combination of hardware and microcode implementing a layered architecture. In an example security module, the hardware layer includes a random number generator, asymmetric encryption according to the public key infrastructure (PKI), symmetric encryption, and hash encryption. A firmware layer provides cryptographic algorithms such as "Data Encryption Standard" (DES). The firmware layer may also provide the application layer with functions such as certificate handling and PIN handling. An application layer provides security protocol such as secure multipurpose Internet mail extensions (SMIME) and Public Key Cryptography Standard (PKCS) 11. A protocol layer implements secure socket layer (SSL) and similar protocols such as wireless transport layer security (WTLS) and IP security protocol (IPSec). Finally, an application layer includes secure clients and possibly data protection software.

Figure 3:
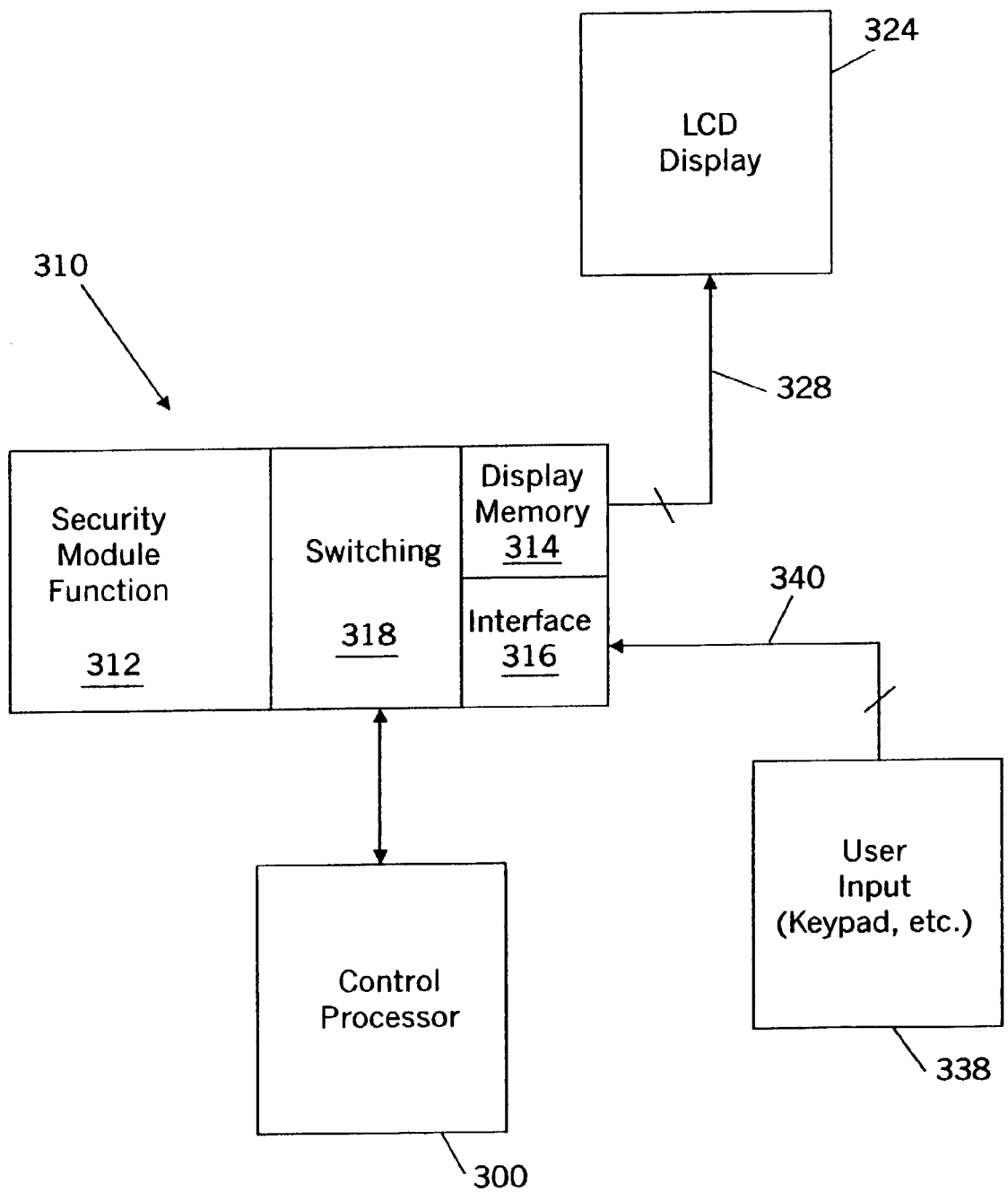
FIG. 3 is a block diagram illustrating some of the hardware components in a mobile terminal according to another embodiment of the invention.

It should be noted that in the embodiment of FIG. 2, the mobile terminal must contain redundant display memory, and possible redundant user input interface components. FIG. 3 is a block diagram illustrating an embodiment that alleviates the need for this redundancy. In FIG. 3, control processor 300 is not directly associated with display memory or a user input interface. Rather, these input/output function components are only included in security module 310. Security module 310 includes the security module function, 312, display memory 314 and, optionally, an interface for user input, 316. Security module 310 also contains a switching block, 318. In this embodiment, LCD display 324 is connected to display memory 314 via lines 328 at all times. Likewise, user input devices 338 are always connected to interface 316 through lines 340. There is no external switching of the display or the user input devices. It should be noted that with any of the embodiments disclosed, a security module can be implemented which only controls the display, leaving the user input devices always under the control of the main control processor. It would also be possible to have the security module control only the receipt of user input, and leave the display memory and display under the control of the main control processor. The invention can be implemented with any one input/output function having its control switched to the security module. As will be seen in the discussion of FIG. 4, the invention can also be implemented by having only a portion of the control of one function switched to the security module. However, the more control that is switched to the security module, the more enhanced will be the security of the mobile terminal.

Returning to FIG. 3, the security module function block, 312, controls the switching block, 318. In this case, the control processor is granted access to display memory 314 through interface 342 by the security module function, 312, at the appropriate times. Similarly, the control processor is granted access to Interface 316 through interface 340 at the appropriate times. During authorization, security module function 312, through switching block 318, switches control away from control processor 300 so that the security module function controls display memory 314 and interface 316. The system of FIG. 3 allows a mobile terminal to contain fewer redundant systems and components, thereby decreasing costs, although switching may be somewhat more complex. The single display memory, and if present, the single interface, both associated with the security module, are selectively connected to either the security module or the control processor under the control of the security module function within the security module. In this case, the display memory is selectively addressed by either the security module function or the control processor.

Note that in the embodiments shown in FIGS. 2 and 3, there is additional redundancy beyond that just discussed with respect to FIG. 2. This additional redundancy stems from the fact that many elements that are typically displayed on a mobile terminal display are independent of the particular information, including transaction information, that is being displayed when received over the network. These include battery indicators, Email indicators, and other information with respect to the status of the phone and the type of activity in which the user is currently engaged. Because the security module of the present invention completely controls the display of information in the embodiments of FIGS. 2 and 3, the security module must have knowledge of these elements, and be able to write these elements to the display memory. Some of these elements are programmed into a mobile terminal by the manufacturer, by the service provider, or even by the user depending on selections made on various setup menus. Provisions must be made, in the embodiments of FIGS. 2 and 3, to program the correct information into both the main processing platform and the security module. This can be accomplished with a copy mechanism similar to that used in many GSM phones to copy a phone book between the main memory of a phone and a SIM. This scheme is highly secure since the security module always has complete control of everything displayed, and not just transaction information. However, in some architectures, it may be desirable to eliminate this redundancy.

Figure 4:
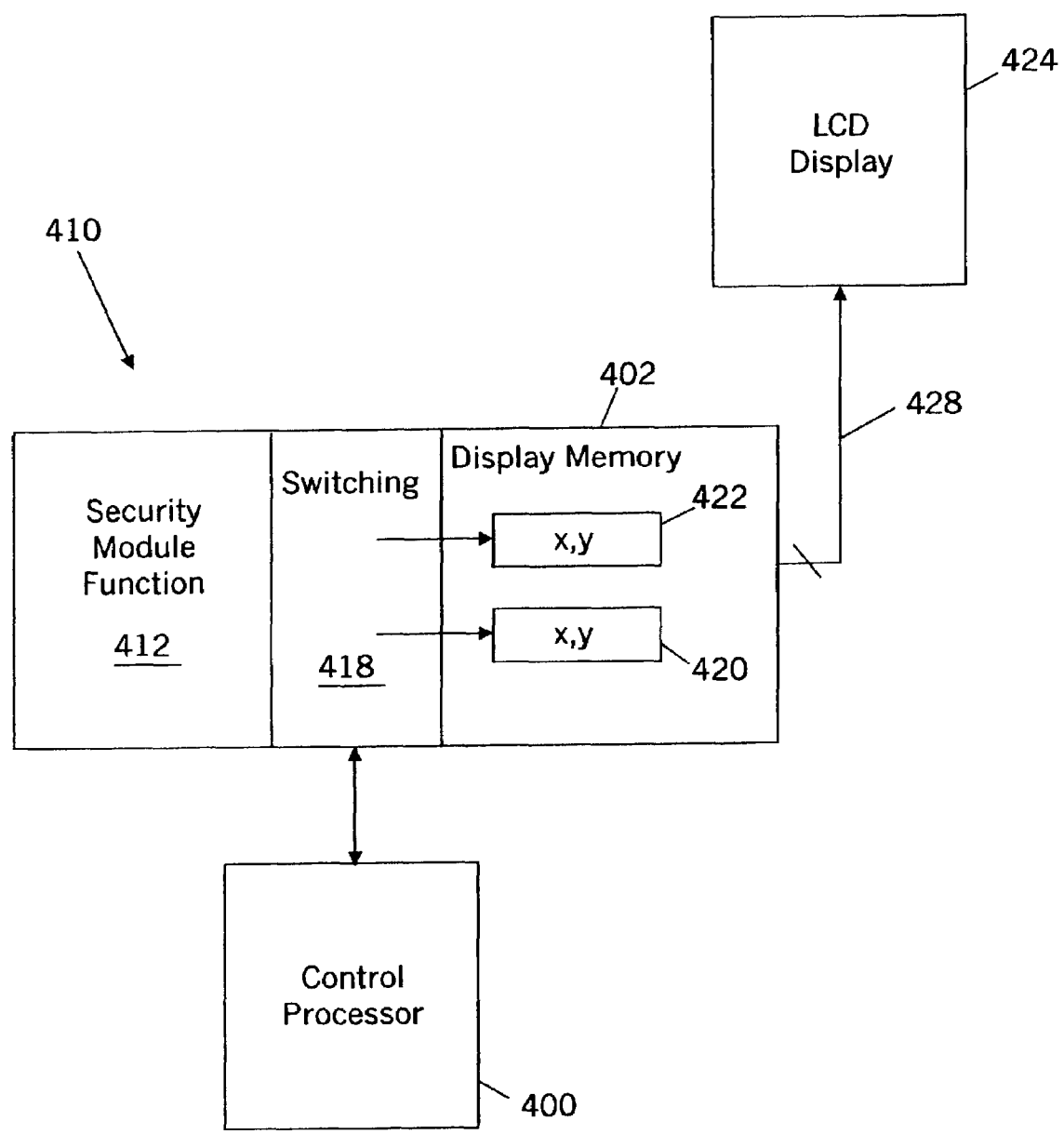
FIG. 4 is a block diagram illustrating some of the hardware components of a mobile terminal according to still another embodiment of the invention.

FIG. 4 is a block diagram illustrating an architecture in which the security module only controls a portion of what is displayed. In FIG. 4 control processor 400 always addresses some portion, 420, of display memory 402, which is disposed within security module 410. Security module function block 412 controls switching block 418 to switch the addressing of only specific areas, 422, of display memory 402 away from control by processor 400 and in favor of control by security module function 412. These areas are specified, for example, by x,y coordinates as indicated. For purposes of the illustrative example of FIG. 4, it is assumed that security module control is only implemented with respect to the display, and is not implemented with respect to a user input interface. User input interface function and control can easily be incorporated into security module 410 as before. Also as before, LCD display 424 is permanently connected to security module 410 and display memory 402 disposed within, by lines 428. With the architecture of FIG. 4, the security module need not contain redundant information related to display elements that do not have anything to do with displaying actual transaction information. As previously mentioned, this may leave those elements more open to tampering through the use of a control processor resident virus, however, this system may be more desirable in terms of efficiency or cost.

With the architectures of the aforementioned embodiments of the invention, an additional security enhancement becomes possible with appropriate programming of the mobile terminal, and the server at the merchant or service provider location. Since the security module has access to display memory, the security module can create a copy of exactly what is displayed to a user, contemporaneously with the user giving authorization for a transaction. This copy can be secured with one or more of the security algorithms contained in the security module, for example PKI or DES. This secured copy of the screen display can then be included as a "payload" in a return message authorizing the transaction through the wireless network. In this manner, the merchant or service provider would be able to record an exact copy of the screen display that was viewed by the user when authorization was given. This copy could be used to provide an indication of the presence or absence of a fraud. When the term "copy" is used herein, it simply refers to the act of reading the display memory contents and moving them into the appropriate message format with any processing necessary to secure the display data. Thus, display data is copied contemporaneously with receiving authorization input, and communicated over the wireless network. The term "contemporaneously" simply means that the copy is made substantially at the same time, as authorization is input, thereby ensuring that the screen will not be different from that viewed when authorization is given. Thus, the display data is presumptively representative of the transaction information viewed by the user.

Figure 5:
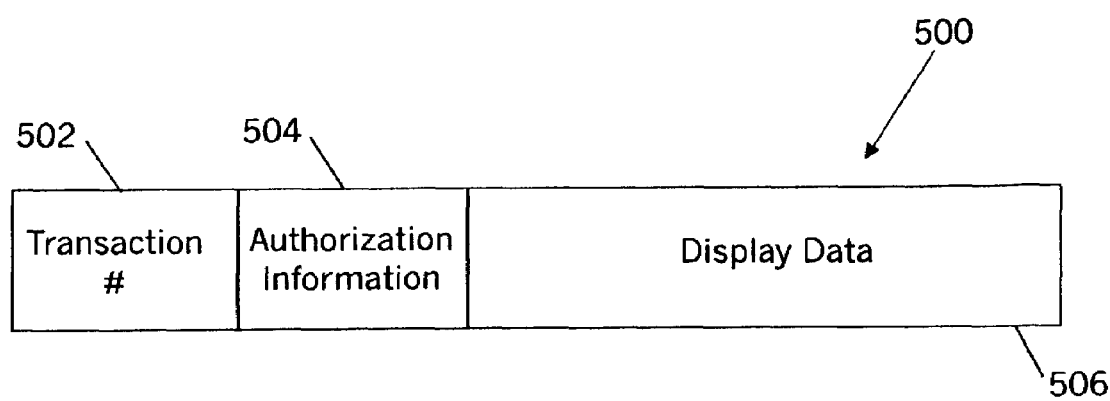
FIG. 5 illustrates an authorization message being returned by a mobile terminal according to one embodiment of the invention.
Figure 6:
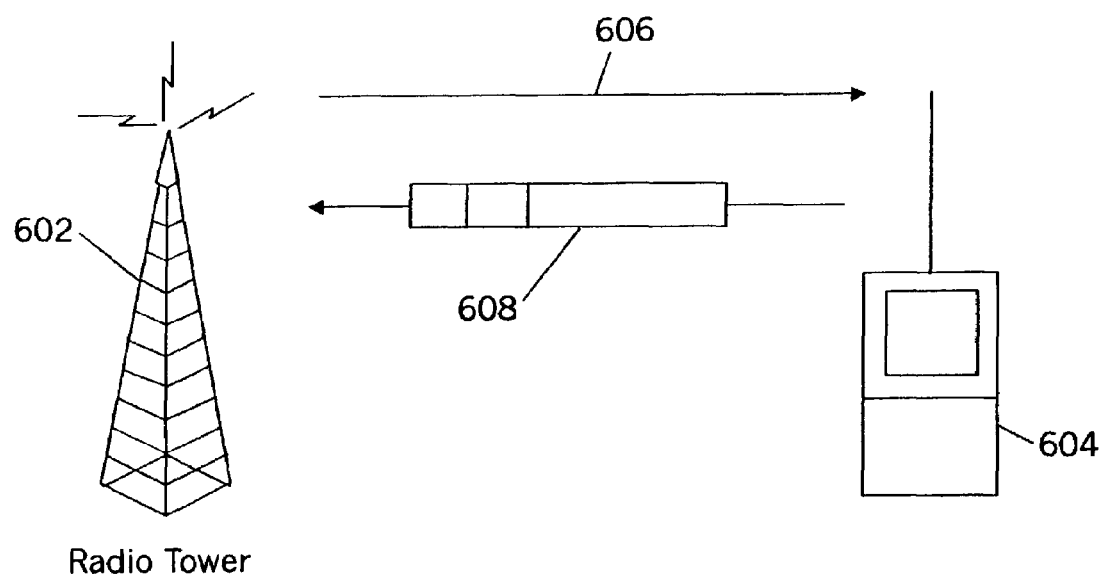
FIG. 6 is a network diagram according to some embodiments of the invention.

FIGS. 5 and 6 illustrate this technique. FIG. 5 is a graphical illustration of a response message that might be used to authorize a transaction over a wireless network. Message 500 in FIG. 5 includes a transaction number, 502, authorization information 504, and the display data, 506. Authorization information, as shown at 504, typically includes an indication of whether or not the transaction has been successfully authenticated and authorized by the user, as well as any security information that is required. For example, certificate information might be needed if certificates issued by a certificate authority (CA) are being used in the particular authentication technique.

FIG. 6 is a graphical illustration of the method of the invention as embodied in a typical wireless network architecture. Radio tower 602 represents the wireless network infrastructure. Wireless terminal 604 is in communication with the wireless network. Transaction information, including a request for authorization, is forwarded from the wireless network to the wireless terminal at 606. The wireless terminal verifies or authenticates the transaction and authorization is given by the user through an input device on the wireless terminal. The screen display is contemporaneously copied when authorization input is received, and this screen display, together with other required information is communicated back to the wireless network through a message at 608. It must be emphasized that this extra technique of returning display data to the source is completely optional. The embodiments previously described in which the security module prevents tampering by controlling what is displayed, and possibly how user input is handled, can be implemented by themselves and provide a high degree of protection. Likewise, the copying and securing of display data could also be performed independently, without the security module having complete control of the display. In this case, the security module would simply have a path through which it can read the display memory while still allowing the main control processor of the wireless communication terminal to control what is written to the display memory.

Figure 7:
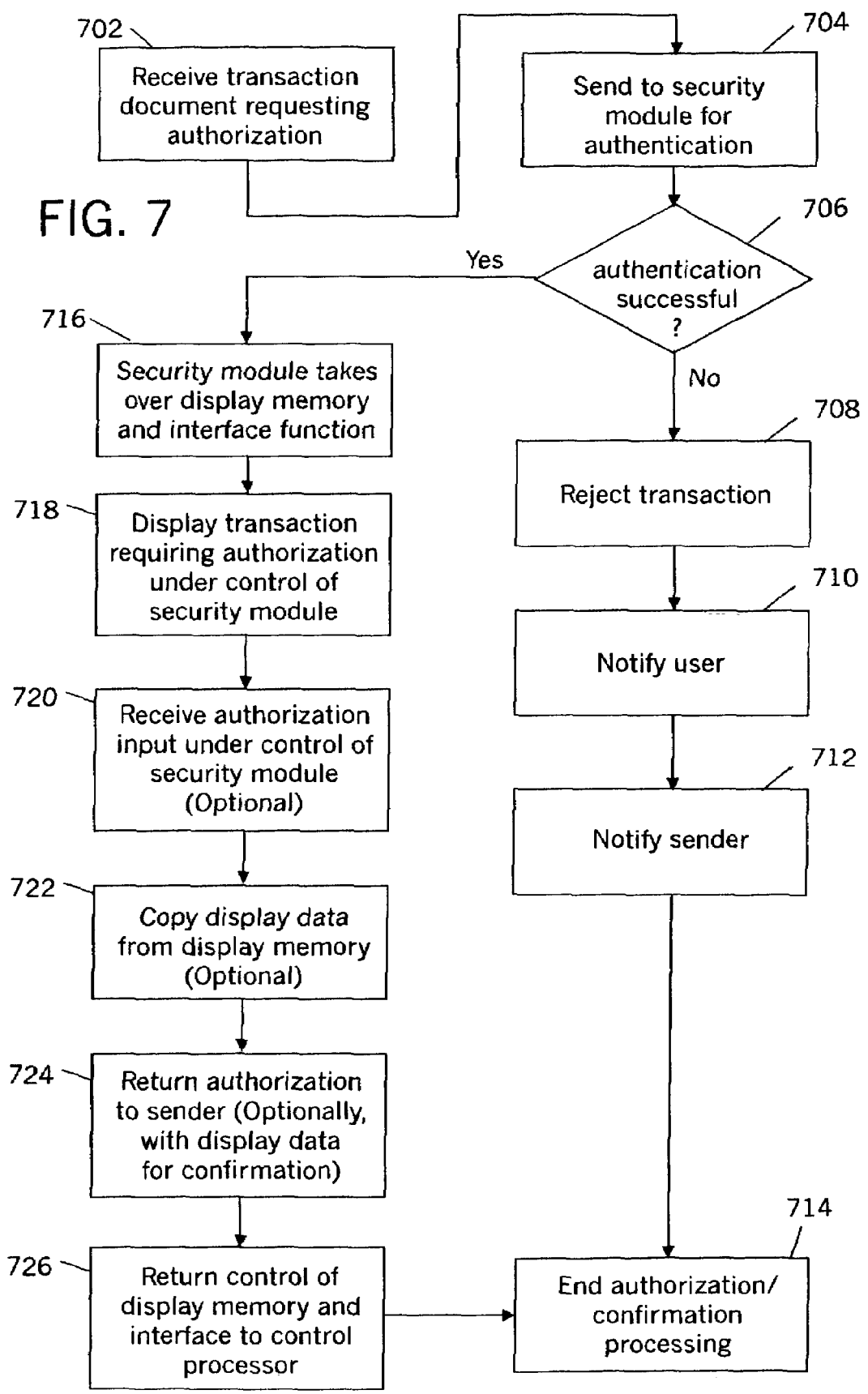
FIG. 7 is a flowchart illustrating the method of the invention according to some embodiments.

With the understanding of the mobile terminal hardware architectures presented thus far, one can follow the process of the invention as illustrated by the flow chart of FIG. 7. At step 702, a transaction document requesting authentication and/or authorization is received at the mobile terminal. The document contains transaction information which is to be presented to the user. At step 704, the transaction information is sent to the security module for verification. In one embodiment, the verification consists of authentication using any one of the various security algorithms which is deployed in the network, and can be included in the security module. The process branches at step 706 depending on whether the authentication is successful. If not, the transaction is rejected at step 708 and the user and sender are notified at steps 710 and 712, respectively. In this case, the process ends at step 714.

If verification or authentication is successful at step 706, the security module takes over the display memory and interface functions at step 716. Transaction information is displayed to the user at step 718 under the control of the security module. Authorization input is received from the user at step 720. In this embodiment, the authorization input is received under the control of the security module, through a user input device interface. At step 722, an optional step, the copying of display data from display memory is shown. At step 724, a message is returned to the sender with the appropriate authentication and authorization. If the display data copying feature is implemented, this message would also include the display data for confirmation of the transaction that the user actually approved. At step 726, control of the display memory and the user input device interface is returned to the main control processor. Again, the process ends at step 714.

Figure 8:
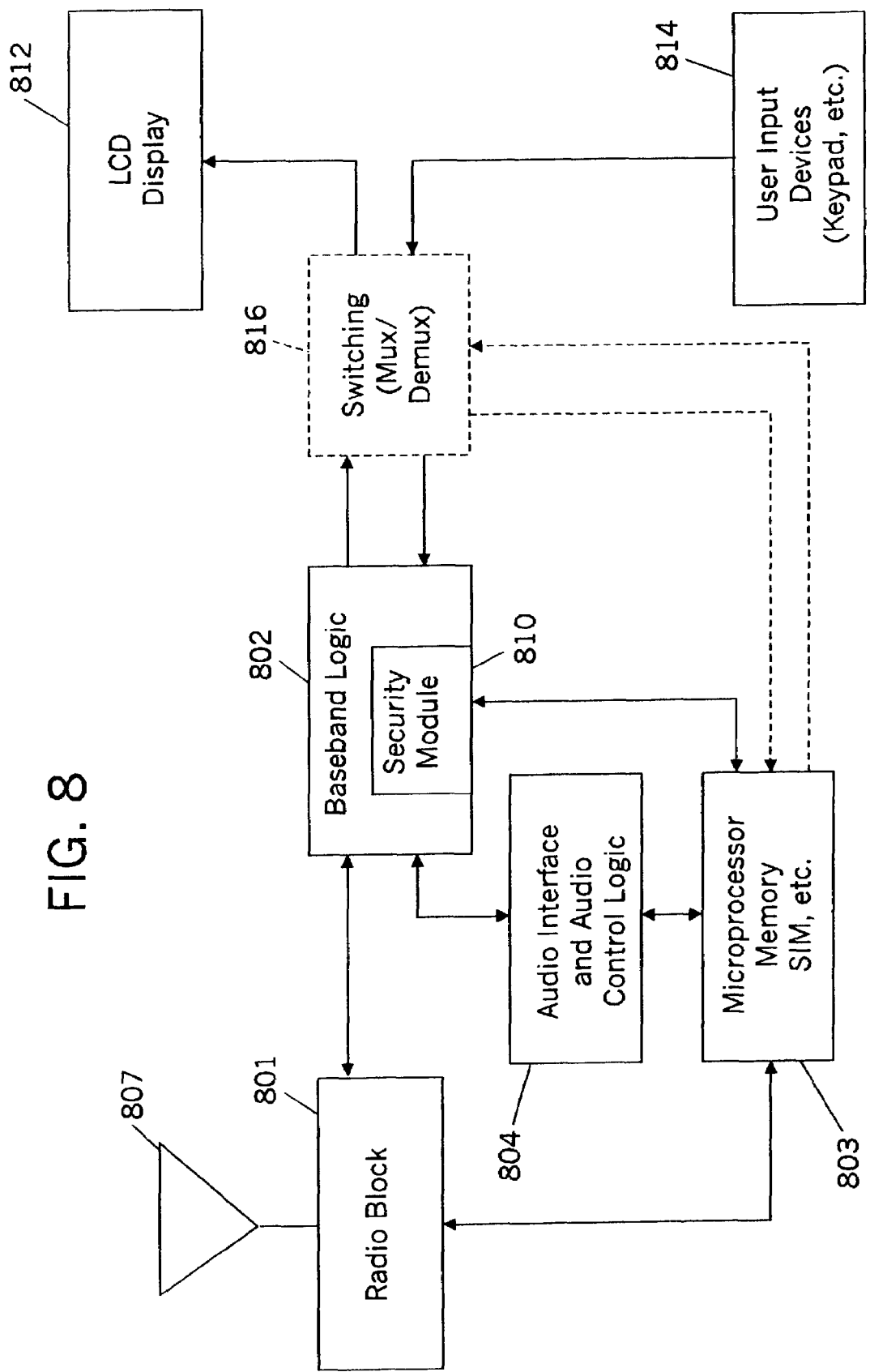
FIG. 8 is a more comprehensive block diagram of a mobile terminal which can implement some embodiments of the invention.

FIG. 8 is a functional block diagram of a mobile terminal that implements one or more aspects of the invention. The terminal of FIG. 8 is an example only. The invention will work equally well in any type of mobile terminal with any variety of inputs, outputs, and functionality. The terminal of FIG. 8 includes a block of core processing functions 800. This core functional block in turn includes baseband logic block 802, and main control processor, 803. The control processor, typically a microprocessor or digital signal processor is associated with a main memory, 804, a SIM, 805, and other components and/or software or microcode to control and operate the mobile terminal, including software and/or microcode to involved in implementing the invention. Audio interface block 806 includes control logic to process audio for the audio interfaces, which are omitted for clarity. Within radio block 801, received and transmitted messages are converted from and to radio frequencies of the various carrier types, and filtering using base or intermediate frequency circuitry is applied, as is understood in the art. The terminal includes an antenna system 807, connected to the radio block. Baseband logic block 802 includes basic signal processing for synchronization, channel coding, decoding and burst formatting, and similar functions as is understood in the art. The core functional block, 800, also includes security module 810 according to the present invention. Security module 810 is functionally connected to the control processor, 803. This example terminal also includes LCD display 812 and one or more user input devices 814. The user input devices may in fact be audio devices that are also connected to the audio interface block.

The solid line shown in FIG. 8 interconnecting the display, and user input devices, to the main control processor, 803, represent how these elements would interface to the security module in an embodiment where the only display memory and interface for user input are both disposed within the security module of the invention. Switching block 816 is present only in an embodiment where display memory and user input interface components are duplicated in both the security module and the control processor. In this case, additional connections would be made to the control processor from switching block 816, as shown by dotted lines. As a practical matter, the security module function can be included in the same semiconductor device with any of the various logic blocks for convenience. It would typically be included in a baseband logic ASIC, but could just as easily be incorporated into the same ship as the main control processor, or in another processor included in the mobile terminal.

While the present invention is described herein in the context of a mobile terminal similar to a traditional "cellular" telephone, as used herein, the terms "mobile terminal", "wireless terminal", and the like are synonymous and may include a cellular radio telephone with or without a multi-line display; a personal communication system (PCS) terminal that may combine the cellular radio telephone with data processing, facsimile and data communications capabilities; a personal data assistant (PDA) that can include a radio telephone, pager, internet access, organizer; and a conventional laptop and/or palm top computer or other appliance that includes a radio telephone transceiver. Mobile terminals are sometimes also referred to as "pervasive computing" devices. Alternatively, the communication channel used by the mobile terminal could be a Wireless LAN (802.11), Bluetooth, Infrared (IRDa) or other short range method.

Specific embodiments of an invention are designed herein. One of ordinary skill in the telecommunications and computing arts will quickly recognize that the invention has other applications in other environments. In fact, many embodiments and implementations are possible. The following claims are in no way intended to limit the scope of the invention to the specific embodiments described.

We claim:

1. A method of securing a transaction at a terminal in communication with a wireless network, the method comprising:

receiving information corresponding to the transaction at the terminal;

internally switching control of at least some input/output function of the terminal from a control processor to a security module in the terminal, the switching accomplished under control of the security module;

presenting the information corresponding to the transaction to a user on a visual display at least in part under control of the security module for authorization by the user;

receiving authorization input from the user;

creating an exact copy of a screen display that was viewed by the user when receiving the authorization input;

communicating the authorization input and the exact copy of the screen display over the wireless network; and returning control of the at least some input/output function to the control processor.

2. The method of claim 1 wherein the at least some input/output function further comprises user input.

3. The method of claim 2 wherein the user input is received through an interface operable to receive authorization from the user by a technique comprising at least one of the group of techniques consisting of: keypad entry of a personal identification number (PIN), voice recognition, finger print recognition and retina scan.

4. Apparatus for securing a transaction through a wireless network, the apparatus comprising:

means for receiving information corresponding to the transaction at the apparatus;

means for internally switching control of at least some input/output function of the apparatus between a control processor and a security module, the switching accomplished under control of the security module;

means for presenting the information corresponding to the transaction to a user on a visual display at least in part under control of the security module for authorization by the user;

means for receiving authorization input from the user;

means for creating an exact copy of a screen display that was viewed by the user when receiving the authorization input; and means for communicating the authorization input and the exact copy of the screen display over the wireless network.

5. A terminal comprising:

a radio block for sending and receiving over a wireless network;

a display for presenting to a user information corresponding to a transaction to be authorized over the wireless network;

at least one user input device;

a control processor operatively connected to the display, the radio block, and the at least one user input device; and a security module, operatively connected to the display and the control processor, the security module configured to internally switch control of the display for secure presentation of the information to the user for authorization, and further configured to create an exact copy of a screen display that was viewed by the user when an authorization is given and to forward the exact copy of the screen display over the wireless network.

6. The terminal of claim 5 wherein the security module further comprises display memory operable to store the information to enable the secure presentation of the information.

7. The terminal of claim 6 wherein the display memory can be selectively addressed under control of the security module by either the security module or the control processor.

8. The terminal of claim 6 wherein the security module further comprises an interface for receiving the authorization through the at least one user input device under control of the security module.

9. The terminal of claim 7 wherein the security module further comprises an interface for receiving the authorization through the at least one user input device, and wherein the interface can be selectively connected to either the security module or the control processor under control of the security module.

10. The terminal of claim 8 wherein the interface is operable to receive authorization from the user by a technique comprising at least one of the group of techniques consisting of: keypad entry of a personal identification number (PIN), voice recognition, finger print recognition and retina scan.

11. The terminal of claim 9 wherein the interface is operable to receive authorization from the user by a technique comprising at least one of the group of techniques consisting of: keypad entry of a personal identification number (PIN), voice recognition, finger print recognition and retina scan.

* * * * *

UNITED STATES PATENT AND TRADEMARK OFFICE
CERTIFICATE OF CORRECTION

PATENT NO. : 7,269,846 B2  
APPLICATION NO. : 10/231958  
DATED : September 11, 2007  
INVENTOR(S) : Sandeep Chennakeshu et al.

It is certified that error appears in the above-identified patent and that said Letters Patent is hereby corrected as shown below:

Title Page;

Item (73) Assignee, Line 1: change "Bank of America" to "Sony Ericsson Mobile Communications AB"

Item (73) Assignee, Line 2: change "Charlotte, NC" to "Lund, Sweden"

Signed and Sealed this

Tenth Day of November, 2009

David J. Kappos
*Director of the United States Patent and Trademark Office*